United States Patent
Scaife et al.

(10) Patent No.: US 10,496,914 B2
(45) Date of Patent: Dec. 3, 2019

(54) PAYMENT CARD OVERLAY SKIMMER DETECTION

(71) Applicant: UNIVERSITY OF FLORIDA RESEARCH FOUNDATION, INCORPORATED, Gainesville, FL (US)

(72) Inventors: Walter N. Scaife, Gainesville, FL (US); Patrick G. Traynor, Gainesville, FL (US); Christian Peeters, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 16/173,668

(22) Filed: Oct. 29, 2018

(65) Prior Publication Data

US 2019/0130240 A1    May 2, 2019

Related U.S. Application Data

(60) Provisional application No. 62/579,452, filed on Oct. 31, 2017.

(51) Int. Cl.
| | | |
|---|---|---|
| *G06K 19/073* | (2006.01) | |
| *G06K 19/06* | (2006.01) | |
| *G06K 19/07* | (2006.01) | |
| *G06K 7/08* | (2006.01) | |
| *G07F 19/00* | (2006.01) | |

(52) U.S. Cl.
CPC ....... *G06K 19/07309* (2013.01); *G06K 7/087* (2013.01); *G06K 19/06196* (2013.01); *G06K 19/0708* (2013.01); *G07F 19/2055* (2013.01)

(58) Field of Classification Search
CPC ....... G06K 19/07309; G06K 19/06196; G06K 19/0708; G06K 7/087; G07F 19/2055
See application file for complete search history.

(56) References Cited

U.S. PATENT DOCUMENTS

| 7,917,398 B2* | 3/2011 | Gibson | G06Q 10/02 |
| | | | 705/26.63 |
| 8,622,297 B1* | 1/2014 | Yokomoto | G07F 19/2055 |
| | | | 109/8 |

(Continued)

OTHER PUBLICATIONS

*Welcome to MagnePrint®: What Is MagnePrint?*, MagTek, Inc. (2013), 1 page, [retrieved from the Internet Jul. 19, 2019] <URL: http://www.magneprint.com/>.

(Continued)

*Primary Examiner* — Daniel I Walsh
(74) *Attorney, Agent, or Firm* — Alston & Bird LLP

(57) ABSTRACT

Devices and methods for detecting credit card skimmers are provided herein. A device can include a printed circuit board having a pattern of electrical traces on its surface, and a computer readable medium comprising instructions that cause a processor to direct an electrical voltage to a trace and detect an electrical current between two points of the trace. A gap can be disposed between the two points across which a voltage is applied in order to detect a magnetic reader. A count of the detected magnetic readers within a credit card reading device may be indicative of the presence of a credit card skimmer.

20 Claims, 12 Drawing Sheets

(56) References Cited

U.S. PATENT DOCUMENTS

| | | | | |
|---|---|---|---|---|
| 9,576,159 | B1* | 2/2017 | Templeton | G06K 7/0004 |
| 9,892,293 | B1* | 2/2018 | Wade | G06K 7/10277 |
| 10,062,078 | B1* | 8/2018 | Boates | G06Q 20/4016 |
| 10,127,409 | B1* | 11/2018 | Wade | G06Q 20/30 |
| 2004/0093302 | A1* | 5/2004 | Baker | G06Q 30/06 705/37 |
| 2005/0108106 | A1* | 5/2005 | Tomlin | G06Q 30/02 705/26.35 |
| 2005/0194452 | A1* | 9/2005 | Nordentoft | G06Q 20/341 235/492 |
| 2006/0186209 | A1* | 8/2006 | Narendra | G06K 19/06187 235/492 |
| 2007/0276944 | A1* | 11/2007 | Samovar | G07C 9/00103 709/225 |
| 2008/0116285 | A1* | 5/2008 | Shoemaker | G06K 19/06187 235/493 |
| 2008/0154623 | A1* | 6/2008 | Derker | G06Q 10/087 705/1.1 |
| 2008/0162211 | A1* | 7/2008 | Addington | G06Q 10/02 705/14.5 |
| 2009/0159671 | A1* | 6/2009 | Mullen | G06K 19/06206 235/380 |
| 2011/0006112 | A1* | 1/2011 | Mueller | G06K 7/082 235/379 |
| 2011/0174874 | A1* | 7/2011 | Poznansky | G06K 19/12 235/379 |
| 2012/0002313 | A1* | 1/2012 | Miyabe | G06K 7/084 360/2 |
| 2013/0119136 | A1* | 5/2013 | Ishikawa | G07F 19/2055 235/449 |
| 2013/0299582 | A1* | 11/2013 | Ozawa | G06K 7/0091 235/440 |
| 2014/0006277 | A1* | 1/2014 | Rao | G06Q 20/341 705/41 |
| 2014/0136410 | A1* | 5/2014 | Akin | G06Q 20/4016 705/44 |
| 2014/0158768 | A1* | 6/2014 | Ray | H04K 3/825 235/449 |
| 2015/0091547 | A1* | 4/2015 | Vasilev | G07F 19/2055 324/76.45 |
| 2016/0070939 | A1* | 3/2016 | Bytheway | G06K 7/0095 235/438 |
| 2016/0162712 | A1* | 6/2016 | Ozawa | G06K 7/084 235/440 |
| 2016/0358059 | A1* | 12/2016 | Chatterton | G06F 21/77 |
| 2018/0060578 | A1* | 3/2018 | Kim | G07F 19/2055 |
| 2018/0075263 | A1* | 3/2018 | Ishikawa | G06K 7/08 |
| 2018/0188884 | A1* | 7/2018 | Bytheway | G06F 3/0416 |
| 2018/0314862 | A1* | 11/2018 | Traynor | G06K 7/087 |
| 2019/0122011 | A1* | 4/2019 | Shangguan | G01R 31/001 |
| 2019/0130240 | A1* | 5/2019 | Scaife | G06K 19/07309 |

OTHER PUBLICATIONS

Agrawal et al., *Credit Card Fraud Detection: A Case Study*, 2015 2nd International Conference on Computing for Sustainable Global Development (INDIACom), (2015), pp. 5-7, New Delhi, India.

Agrawal et al., *A Novel Approach for Credit Card Fraud Detection*, 2015 2nd International Conference on Computing for Sustainable Global Development (INDIACom), (2015), pp. 8-11, New Delhi, India.

Anderson, *Why Cryptosystems Fail*, CCS '93 Proceedings of the 1st ACM Conference on Computer and Communications Security, Nov. 3, 1993, pp. 215-227, Fairfax, Virginia. DOI: 10.1145/168588. 168615.

Anderson et al., *EMV: Why Payment Systems Fail*, Viewpoints, Communications of the ACM, Jun. 2014, vol. 57, No. 6, pp. 24-28. DOI: 10.1145/2602321.

Bond et al., *Chip and Skim: Cloning EMV Card With the Pre-Play Attack*, 2014 IEEE Symposium on Security and Privacy, San Jose, CA, 2014, pp. 49-64. DOI: 10.1109/SP.2014.11.

Bukhari, *That Chip on Your Credit Card Isn't Stopping Fraud After All*, Fortune, Feb. 1, 2017, 2 pages, [retrieved from the Internet Jul. 17, 2019] <URL: https://fortune.com/2017/02/01/credit-card-chips-fraud>.

Chan et al., *Distributed Data Mining in Credit Card Fraud Detection*, IEEE Intelligent Systems, Nov./Dec. 1999, vol. 14, pp. 67-73. DOI: 10.1109/5254.809570.

Chan et al., *Toward Scalable Learning With Non-Uniform Class and Cost Distributions: A Case Study in Credit Card Fraud Detection*, In KDD, vol. 1998, Aug. 27, 1998, pp. 164-168.

Chaum, *Achieving Electronic Privacy*, Scientific American, Aug. 1992, pp. 96-101.

Corkery, *Wells Fargo Fined $185 Million for Fraudulently Opening Accounts*, The New York Times, Sep. 8, 2016, 5 pages, [retrieved from the Internet Jul. 17, 2019] <URL: https://www.nytimes.com/2016/09/09/business/dealbook/wells-fargo-fined-for-years-of-harm-to-customers.html>.

De Ruiter et al., Formal analysis of the EMV protocol suite, In *Theory of Security and Applications*, Mar./Apr. 2011, (233 pages), S. Modersheim and C. Palamidessi, Eds., Lecture Notes in Computer Science, Springer Berlin Heidelberg, Saarbrucken, Germany, 233 pages. DOI: 10.1007/978-3-642-27375-9.

Drimer et al., *Keep Your Enemies Close: Distance Bounding Agains Smartcard Relay Attacks*, USENIX Security Symposium, vol. 312, Aug. 6, 2007, (16 pages).

Drimer et al., *Chip & PIN (EMV) Relay Attacks*, Computer Laboratory University of Cambridge, (2013), pp. 1-5, [retrieved from the Internet Jul. 17, 2019] <URL: https://www.cl.cam.ac.uk/research/security/banking/relay>.

Dutton, *Wired's Lab-Tested, Muppet-Vetted Formulas for Smartifying Your Life*, Wired Magazine, Nov. 1, 2011, (20 pages), [retrieved from the Internet Jul. 17, 2019] <URL: https://www.wired.com/2011/11/ff_betterliving/>.

Hamblen, *Chip Card Payment Confusion, Anger Rages on—Merchants Blame Card Companies for Delays in Certifying EMV Software*, Computerworld, Apr. 21, 2016, (8 pages), [retrieved from the Internet Jul. 19, 2019] <URL: http://www.computerworld.com/article/3059379/mobile-payments/chip-card-payment-confusion-anger-rages-on.html>.

Harrell, *Victims of Identity Theft, 2014*, U.S. Department of Justice, Office of Justice Programs, Bureau of Justice Statistics, Nov. 13, 2017, (26 pages), [retrieved from the Internet Jul. 19, 2019] <URL: https://www.bjs.gov/content/pub/pdf/vit14.pdf>.

Steele, *Payment Method Statistics*, Creditcards.com, Jun. 15, 2015, (9 pages) [retrieved from the Internet Jul. 17, 2019] <https://www.creditcards.com/credit-card-news/payment-method-statistics-1276.php>.

Horan, *Double-Digit ATM Compromise Grown Continues in US*, FICO Blog, Aug. 31, 2017, (2 pages), [retrieved from the Internet Jul. 19, 2019] <URL: https://www.fico.com/blogs/fraud-security/double-digit-atm-compromise-growth-continues-in-us/>.

ISO/IEC. *Identification Cards—Recording Technique—Magnetic Stripe—Low Coercivity*, International Standard, Aug. 15, 2014, Fourth Edition, (8 pages). ISO/IEC 7811-2:2014(E).

ISO/IEC. *Identification Cards—Recording Technique—Magnetic Stripe—High Coercivity*, International Standard, Sep. 1, 2014, Fourth Edition, (11 pages). ISO/IEC 7811-6:2014(E).

Karame et al., *Double Spending Fast Payments in Bitcoin*, Proceedings of the 2012 ACM Conference on Computer and Communications Security, Oct. 16, 2012, pp. 906-917, ACM, Raleigh, North Carolina. DOI: 1.1145/2382196.2382292.

Koiino, *Analysis of an Electronic Voting System*, IEEE Symposium on Security and Privacy 2004, May 12, 2004, pp. 1-23. DOI: 10.1109/SECPRI.2004.1301313.

Krebs, *Chip Card ATM 'Shimmer' Found in Mexico*, Krebs on Security, Aug. 11, 2015, (3 pages), [retrieved from the Internet Jul. 17, 2019] <URL: https://krebsonsecurity.com/2015/08/chip-card-atm-shimmer-found-in-mexico/>.

Krebs, *A Dramatic Rise in ATM Skimming Attacks*, Krebs on Security, Apr. 29, 2016, (4 pages), [retrieved from the Internet Jul. 17, 2019] <URL: https://krebsonsecurity.com/2016/04/a-dramatic-rise-in-atm-skimming-attacks/>.

(56) References Cited

OTHER PUBLICATIONS

Krebs, *All About Fraud: How Crooks Get the CVV*, Krebs on Security, Apr. 26, 2016, (2 pages), [retrieved from the Internet Jul. 17, 2019] <URL: https://krebsonsecurity.com/2016/04/all-about-fraud-how-crooks-get-the-cvv/>.

Krebs, *All About Skimmers*, Krebs on Security, Jul. 2016, (16 pages), [retrieved from the Internet Jul. 17, 2019] <URL: https://krebsonsecurity.com/all-about-skimmers/>.

*Magnetic Card Reader Design Kit*, MAGTEK, May 2017, (28 pages), [retrieved from the Internet Jul. 19, 2019] <URL: https://www.magtek.com/content/documentationfiles/d99821002.pdf>.

McQuay, *Why You Might Not See an EMV-Ready Gas Pump for a While*, Nerdwallet, Sep. 30, 2015, (2 pages), [retrieved from the Internet Jul. 17, 2019] <URL: https://www.nerdwallet.com/blog/credit-cards/emvready-gas-pump/>.

Meiklejohn, *If Privacy Matters, Cash Is Still King*, The New York Times, Dec. 9, 2013, (2 pages), [retrieved from the Internet Jul. 19, 2019] <URL: https://www.nytimes.com/roomfordebate/2013/12/09/the-end-of-cash/if-privacy-matters-cash-is-still-king>.

Murdock et al., *Chip and PIN Is Broken*, 2010 IEEE Symposium on Security and Privacy, Jul. 8, 2010, pp. 433-446. DOI: 10.1109/SP.2010.33.

Neal, *A Fraud Factory in a Small Apartment Made 1,000 Fake Credit Cards a Day, Feds Say*, Bradenton Herald, Nov. 27, 2017, (2 pages), [retriefed from the Internet Jul. 17, 2019] <URL: https://www.bradenton.com/news/local/crime/article186652463.html>.

Nicol, *No Expectation of Privacy in Bank Records—United States v. Miller*, DePaul Law Review 146, vol. 26, Issue 1, Fall 1976, Article 9, (13 pages), [retrieved from the Internet Jul. 19, 2019] <URL: https://via.library.depaul/edu/law-review/vol26/iss1/9>.

Northrup, *The ATM Liability Shift Is Here, and Most Don't Have Chip Readers*, Consumerist, Oct. 21, 2016, (2 pages), [retrieved from the Internet Jul. 17, 2019] <URL: https://consumerist.com/2016/10/21/the-atm-liability-shift-is-here-and-most-dont-have-chip-readers/>.

Paul et al., *The Design of a Trustworthy Voting System*, 2009 Annual Computer Security Applications Conference, Dec. 7, 2009, (11 pages), Honolulu, Hawaii. DOI: 10.1109/ACSAC.2009.54.

Rhoden, *4 Men Accused of Spending Spree With Counterfeit Credit Cards*, The Times—Picayune, Feb. 24, 2017, (2 pages), [retrieved from the Internet Jul. 17, 2019] <URL: https://www.nola.com/news/crime_police/article_137ea46a-ad6d-5ce5-991f-837a7a38d5c4.html>.

Sandler et al., *VoteBox: A Tamper-Evident, Verifiable Electronic Voting System*, In Proceedings of the 17th USENIX Security Symposium, vol. 4, No. 0, Jul. 28, 2008, pp. 349-364.

Scaife et al., *The Cards Aren't Alright: Detecting Counterfeit Gift Cards Using Encoding Jitter*, 2018 IEEE Symposium on Security and Privacy (SP), May 20, 2018, (14 pages), San Francisco, California. DOI: 10.1109/SP.2018.00042.

Srivastava et al., *Credit Card Fraud Detection Using Hidden Markov Model*, IEEE Transactions on Dependable and Secure Computing, vol. 5, No. 1, Feb. 8, 2008, pp. 37-48. DOI: 10.1109/TDSC.2007.70228.

Stolfo et al., *Credit Card Fraud Detection Using Meta-Learning: Issues and Initial Results*[1], AAAI-97 Workshop on Fraud Detection and Risk Management, Jul. 27, 1997, pp. 83-90.

*Total System Services (TSYS), Inc.*, 2016 U.S. Consumer Payment Study, (36 pages), [retrieved from the Internet Jul. 19, 2019] <URL: https://www.tsys.com/Assets/TSYS/downloads/rs_2016-us-consumer-payment-study.pdf>.

Uriarte, *PayThink Gift Card Fraud Will Be a Major Threat Post-EMV*, Payment Source, Jul. 6, 2015, (3 pages), [retrieved from the Internet Jul. 17, 2019] <URL: https://www.paymentssource.com/opinion/gift-card-fraud-will-be-a-major-threat-post-emv>.

\* cited by examiner

280

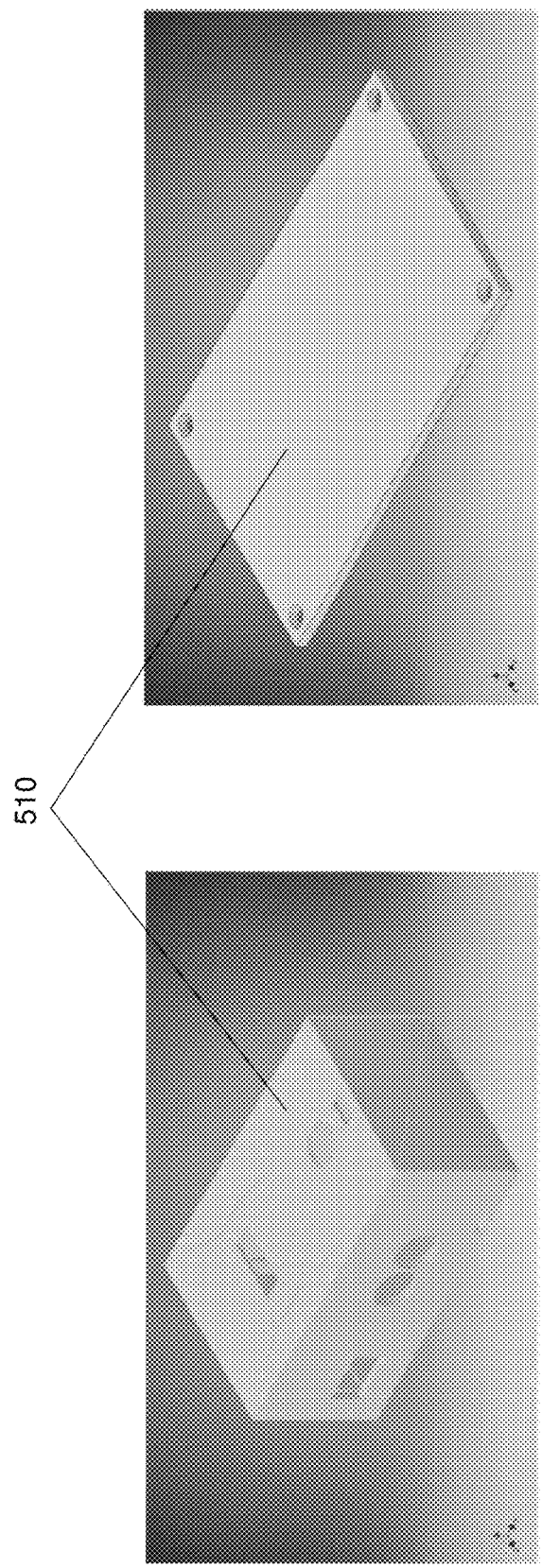

PAYMENT CARD OVERLAY SKIMMER DETECTION

CROSS-REFERENCE TO RELATED APPLICATIONS

This application claims priority to U.S. Provisional Application No. 62/579,452 filed Oct. 31, 2017, which is hereby incorporated herein in its entirety by reference.

TECHNOLOGICAL FIELD

An example embodiment of the present disclosure relates to a method and apparatus for detecting the presence of a magnetic card skimming device, and more particularly, to a method and apparatus to detect the presence of a magnetic card skimming device in response to insertion into a slot of a payment acceptance apparatus.

BACKGROUND

Electronic commercial transactions using magnetic stripe cards, such as credit cards and debit cards, have enabled consumers to access financial assets and lines of credit instantaneously in remote locations. However, the rise of electronic transactions has brought new dangers to the safeguarding of financial and personal data. Adversaries can fabricate credit card skimmers that have or maintain the appearance of legitimate card readers to avoid detection. Credit card skimmers can be located at gas stations, supermarkets, and financial institutions. New methods and devices are required to secure personal and financial information from being stolen or replicated.

BRIEF SUMMARY

Embodiments of the subject invention provide methods and devices for personal and commercial use to detect the presence of credit card skimmers. Embodiments can include devices including a printed circuit board (PCB), which can be inserted into a card acceptor. A device can contain traces that pass over a magnetic read head inside the card slot of the card acceptor. The device can monitor the PCB and alert when multiple read heads are detected but not expected. Embodiments of the subject invention allow consumers, law enforcement, store owners, or others to test card slots for skimmers before use. Businesses can test devices on their premises; for example, gas station owners can periodically test their own pumps.

Embodiments of the present invention may provide a device for detecting the presence of a credit card skimmer including: a PCB comprising a pattern of electrical traces on its surface, wherein the PCB is configured to be inserted into a credit card reader or scanner; a non-transitory machine-readable medium in operable communication with the PCB and comprising instructions stored thereon that, when executed, cause at least one processor to: direct an electrical voltage to a trace pattern of electrical traces; and detect an electrical current between two points of the trace, wherein the pattern comprises a gap disposed between the two points.

According to some embodiments, the PCB may comprise electrical traces that are flat. In certain embodiments, the electrical traces may extend beyond the surface of the PCB. The device for detecting the presence of a credit card skimmer may further comprise a magnetic stripe component configured to allow the PCB to identify itself to a terminal. In certain embodiments of the present invention, the PCB may be directly connected, for example through a wired connection, to the machine-readable medium. The PCB, according to some embodiments, may further comprise wireless circuitry, wherein the wireless circuitry is configured to communicate with the machine-readable medium.

According to some embodiments, the PCB may be configured to be inserted into a "dip" style reader or a "swipe" style reader. In certain embodiments, the device for detecting the presence of a credit card skimmer may further comprise circuitry configured to provide location-based services functionality. According to some embodiments, the PCB may have a credit card shape including a height, width, and thickness all within a range for a typical credit card. The device, in some embodiments, may further comprise a case in which the machine-readable medium is disposed.

The device, in some embodiments, may further comprise a processor in operable communication with the machine-readable medium, wherein the instructions stored on the machine-readable medium, when executed, cause the processor to perform the functions of directing an electrical voltage to a trace of the pattern of electrical traces; and detect an electrical current between two points of the trace, wherein the pattern comprises a gap disposed between the two points.

According to some embodiments, the device for detecting the presence of a credit card skimmer may further comprise at least one switch. In certain embodiments, the switch may further comprise a rocket switch, a single pole single throw (SPST) switch, or both. The device, according to certain embodiments, may further comprise at least one button. According to some embodiments, the at least one button may comprise a pushbutton, an up/down button, a light-emitting diode (LED) button, or any combination thereof. In certain embodiments, the device may further comprise a display. According to some embodiments, the display may be a touch screen display. In certain embodiments, the display may be an organic light-emitting diode (OLED) display.

According to some embodiments, the device for detecting the presence of a credit card skimmer may further comprise a power source. In certain embodiments, the power source may be a battery, for example, a rechargeable battery such as a lithium ion battery. The device, in yet another example embodiment, wherein the processor, if present, the at least one switch, if present, the at least one button, if present, the display, if present, and the power source, if present, may be disposed in or on the case.

In another example embodiment, a method for detecting the presence of a credit card skimmer is provided that includes inserting a PCB comprising a pattern of electrical traces on its surface into a card scanner or reader; applying a voltage to a trace of the pattern of electrical traces; and detecting a current along two points of the trace, wherein the pattern of electrical traces comprises a gap, wherein the gap is disposed between two points, and wherein, if a current is detected along two points of the trace, a read head is detected within the card scanner or reader. Additionally, the method of an example embodiment may further comprise determining an appropriate number of read heads associated with a particular card scanner or reader; and comparing the appropriate number of read heads to a number of read heads detected.

According to some embodiments of the method for detecting the presence of a credit card skimmer, the PCB may be configured to be inserted into a "dip" style reader or a "swipe" style reader. In certain embodiments, the method may further comprise using location-based services to determine a location of the card scanner or reader. According to some embodiments, the method may further comprise outputting a result of the detection to a remote device.

According to some embodiments of the present invention, the method may be carried out using the device for detecting the presence of a credit card skimmer including: a PCB comprising a pattern of electrical traces on its surface, wherein the PCB is configured to be inserted into a credit card reader or scanner; a non-transitory machine-readable medium in operable communication with the PCB and comprising instructions stored thereon that, when executed, cause at least one processor to: direct an electrical voltage to a trace pattern of electrical traces; and detect an electrical current between two points of the trace, wherein the pattern comprises a gap disposed between the two points.

Example embodiments described herein may provide an apparatus including a substrate sized to be received within a credit card reader; a circuit disposed on the substrate, where the circuit includes at least one electrical trace including two points on the trace defining a gap there between; a processor configured to direct an electrical voltage to the at least one electrical trace and to detect an electrical current between the two points of the trace, where the electrical current identifies a magnetic read head; and a communication interface configured to provide an indication of the presence of a credit card skimming device within the credit card reader in response to identifying more than one magnetic read head within the credit card reader. The communication interface may include a wired or wireless connection to a user device, where the user device includes a display to provide an indication of the presence of the credit card skimming device. The substrate may include a printed circuit board with the circuit printed thereon. The substrate may further include a pressure sensor disposed on the substrate, where the pressure sensor provides an indication of application of pressure to the pressure sensor in response to the sensor passing a magnetic read head of the credit card reader, where the processor may be configured to establish a number of magnetic read heads in response to the pressure signal from the pressure sensor.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

BRIEF DESCRIPTION OF DRAWINGS

FIG. 5A illustrates a top plate of a case housing a device according to an embodiment of the subject invention;

FIG. 5B illustrates a bottom plate of a case housing a device according to an embodiment of the subject invention;

DETAILED DESCRIPTION

Figure 1:
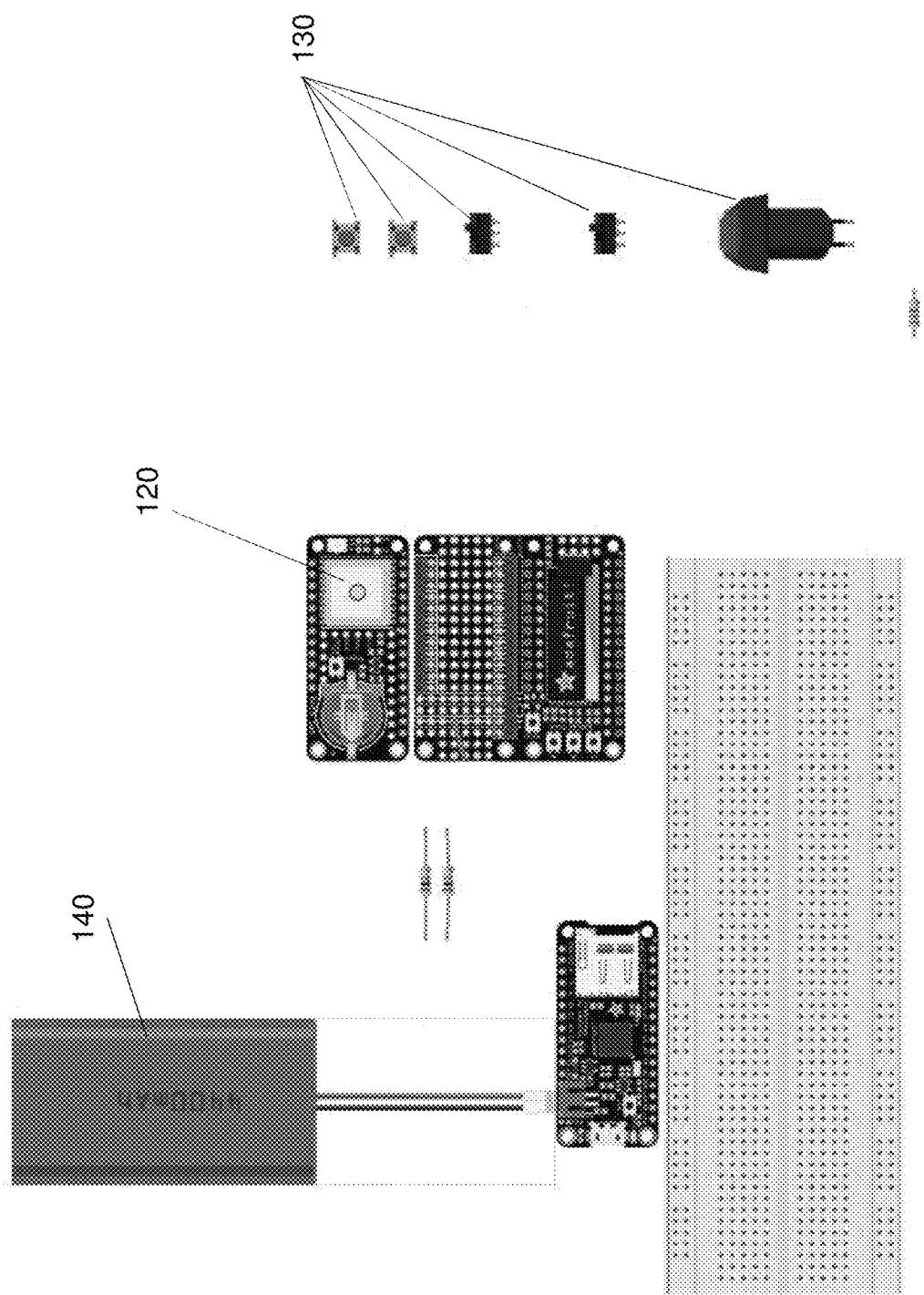
FIG. 1 depicts images of device components according to an embodiment of the subject invention.
Figure 2A:
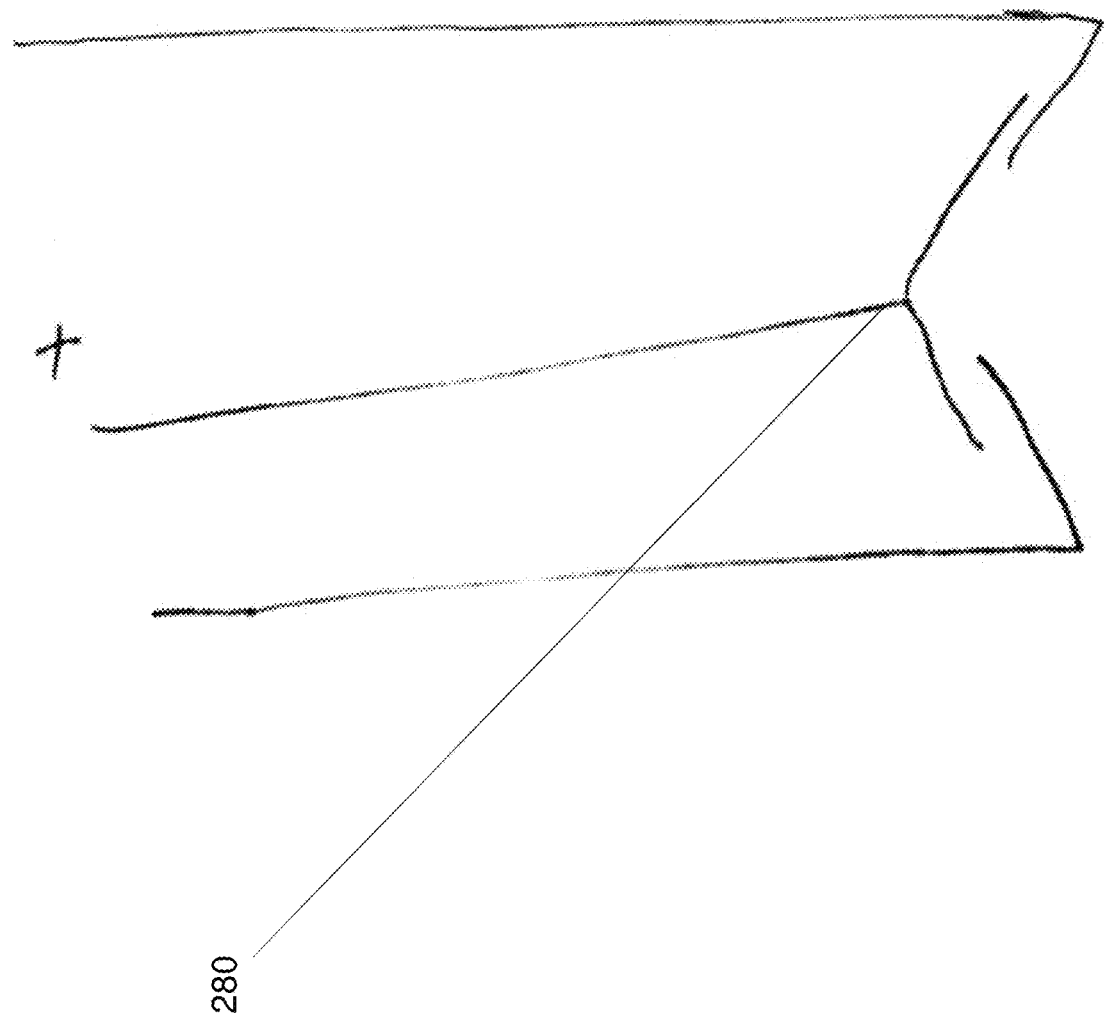
FIGS. 2A and 2B illustrate hand-drawn images of printed circuit board (PCB) traces.
Figure 2B:
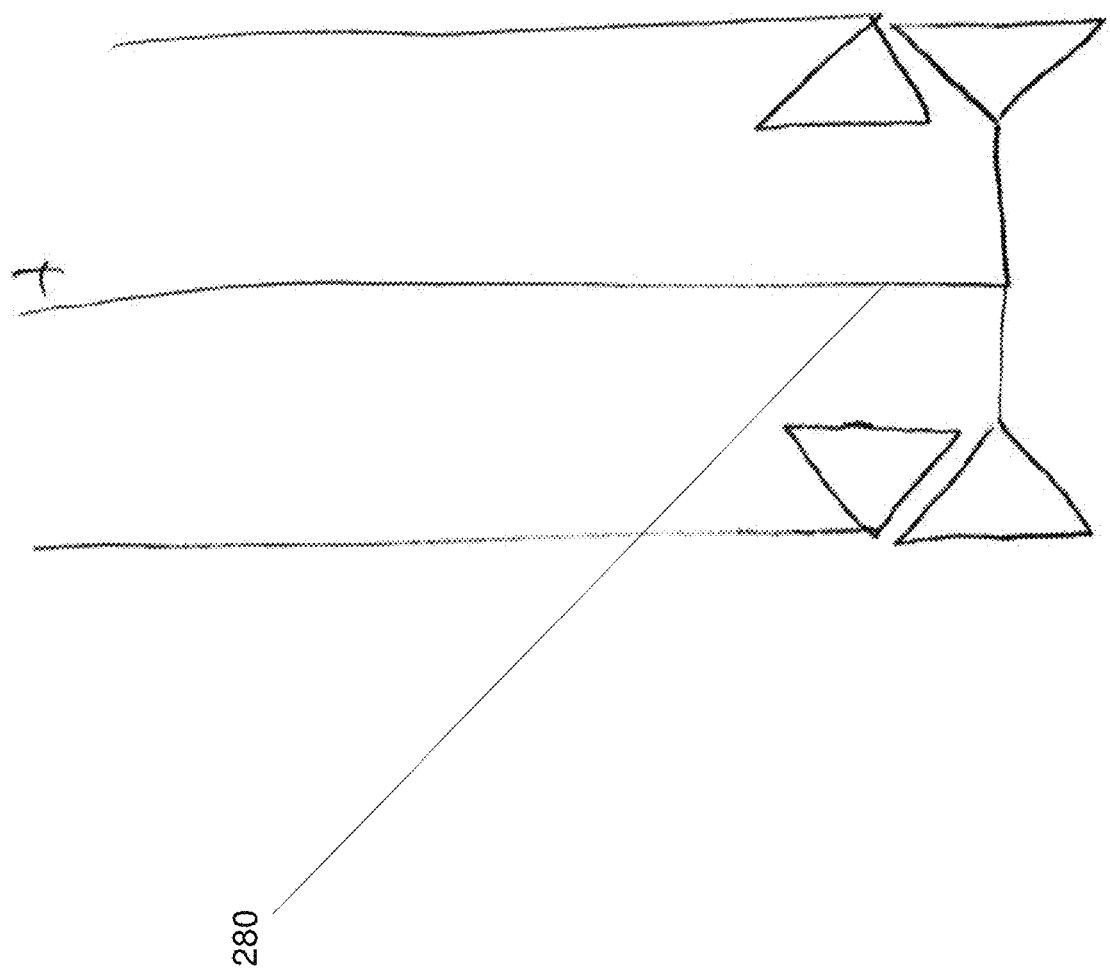

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Embodiments of the subject invention include methods and devices for detecting the presence of a magnetic stripe skimmer or card skimming device (e.g., a credit/debit card skimmer). A device (e.g., a credit card-sized device) can be inserted into the slot of a payment card acceptor. The device can include a printed circuit board (PCB) and can also include traces that pass over the magnetic read head inside the card slot. A voltage can be applied to the traces, and the circuit can be completed as the read head touches a card as it is inserted into the slot of the payment card acceptor. An analysis system can be attached to the card and can monitor the card, providing one or more alerts when multiple read heads are detected but not expected. Additional read heads may indicate the presence of a skimmer attempting to obtain sensitive card data. Consumers can use devices and methods of example embodiments described herein to test card slots for skimmers before use, thereby lessening the risk of exposure of a consumer's personal information stored on a payment card with a magnetic stripe. Devices and methods of the subject invention can also be used for commercial purposes (e.g., by a gas station owner to periodically test the pumps) and/or for law enforcement purposes (e.g., by a police department or sheriff's office).

Skimmer detection systems according to example embodiments may have two primary components, which may exist as a single physical device, as multiple devices, or via a hardware/software combination (e.g., a physical device and an app on a smartphone). The system may include a card-shaped apparatus (that can be referred to as a "detection card" of the system) that can be inserted into a card acceptor slot on a device that reads magnetic stripe cards, such as an ATM or payment terminal. The terminal may include a magnetic read head to read magnetic stripe cards.

The detection card of systems described herein may have a pattern of electrical traces on its surface which may be flat or extend beyond the surface of the device. An electrical charge may be applied to these traces, and as the card passes through the slot, the terminal's read head passes over and touches the detection card. Certain embodiments may contain vastly different trace patterns 280 depending on the expected devices the detection card will be inserted into (see, for example, FIGS. 2A, 2B, and 4A-4E). Upon touching the detection card, a circuit may be completed, passing electrical current over the read head to the remaining traces on the detection card.

The detection card may have additional functionality, including a magnetic stripe component, allowing the detection card to identify itself to a terminal. Such a system would allow the terminal to log when it has been last examined and which specific detection card performed the test. Other functionality might include the use of accelerometers to automatically determine when the card is being inserted into a terminal and whether or not the terminal is a "swipe" reader or a "dip" reader.

The second component can be an analysis system 320 running either as software on a wireless or wired connected platform (e.g., a remote server, a smartphone app, connected via Bluetooth or USB) or as a dedicated device that monitors the traces of the detection card. Using an algorithmic approach (see, for example, FIGS. 6A-6C), the device can determine if the detection card has touched a magnetic read head.

With this approach, the device of example embodiments can determine the number of read heads the card has touched. If the number of detected read heads is above an expected value, the system can alert the user that an additional read head (e.g., a card skimmer) is present. The analysis system 320, which may be built into the physical detection card itself or a separate device or software, can contain additional hardware to record additional data about the system, including but not limited to: pump (e.g. gas station) or terminal number; position coordinates; and terminal type (dip or swipe).

Embodiments of the subject invention may include a PCB (e.g., a custom-shaped PCB, for example, in the shape of a credit card) and additional hardware for processing. Referring to FIG. 1, the hardware can include a processor 120, switches 130, buttons, lighted buttons (e.g., LED buttons), a display (e.g., an OLED display), and a power source 140 (e.g., a battery). The switch can include, for example, rocker switches, and/or single pole, single throw (SPST) switches. The buttons can include, for example, pushbuttons (e.g., aluminum circular pushbuttons), up/down buttons, and/or LED buttons.

Figure 8:
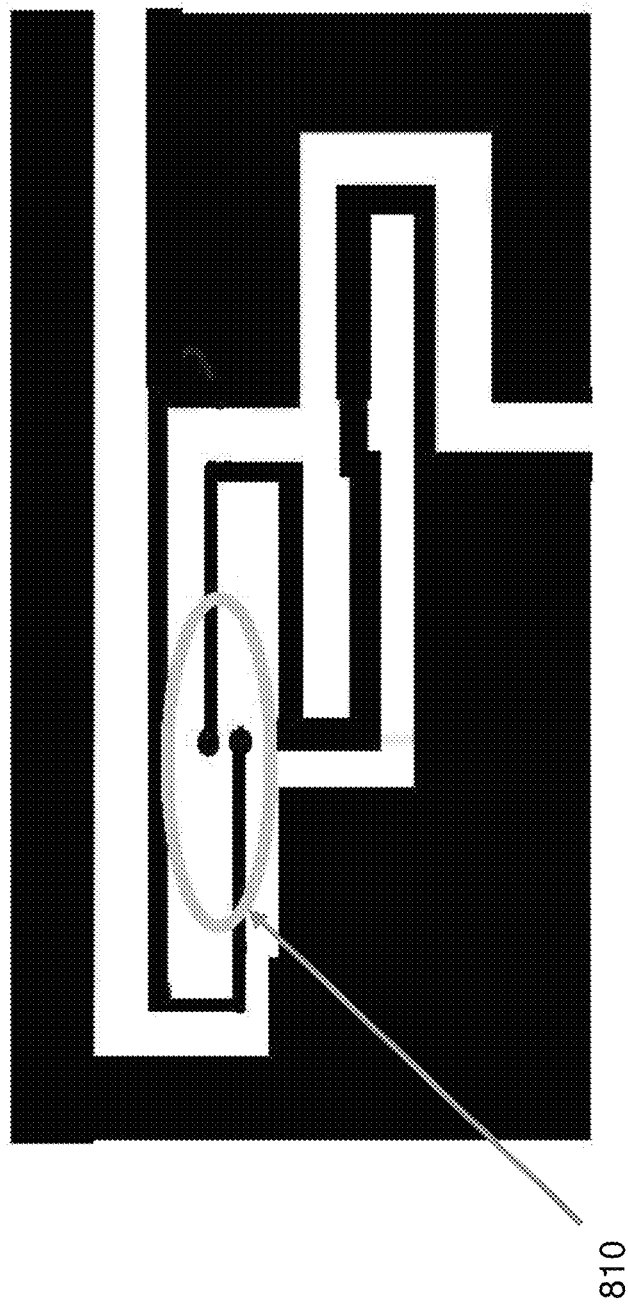
FIG. 8 illustrates an image of gap in an electrical trace on the face of the card according to an embodiment of the subject invention.

The traces on the PCB can be aligned with the locations of the tracks on magnetic stripe cards. There may be a small break or gap in the traces at each track location. The small break or gap in the traces on the PCB may be aligned with track 1, 2, 3 of a magnetic stripe card, or any combination thereof. As seen in FIG. 8, the small break or gap 810 may be situated on a PCB to correspond to track 1, 2, or 3 of a magnetic stripe card. The small break or gap in the traces of the PCB can be a physical break or gap that separates two traces aligned along a track. In other embodiments, the small break or gap can include a region of the trace that includes non-conductive material. When the detection card is inserted into a magnetic stripe reader, upon making contact with a magnetic read head, the break can be bridged, thereby completing the circuit. It should be appreciated by one skilled in the art that a distance of the gap between two portions of a trace can vary. The length of the gap can be a distance that prevents or inhibits a signal passing from a first portion of the trace to the second portion of the trace. The length of the gap can be a distance permitting the magnetic read head to form a bridge between the first portion and the second portion of the trace. The bridge may permit a signal to pass between the first portion, through the bridge, and to the second portion of the trace, thereby completing an electrical circuit. In certain embodiments, the distance of the gap between the two portions of the trace can 2 millimeters or less. The hardware may be configured to apply a steady direct current (DC) voltage to the card and observe if at any point the circuit on the card is complete. Each time that the break is bridged may be an indication to the analysis system that the card has come into contact with a magnetic read head. The analysis system can process these signals and determine if any additional read heads were found in the magnetic stripe card reader. The PCB may vary in dimensions and traces in order to fit into a magnetic stripe card reader and send a signal to the hardware upon making contact with a magnetic read head. The hardware may vary, as long as it accomplishes the tasks previously outlined.

Figure 3:
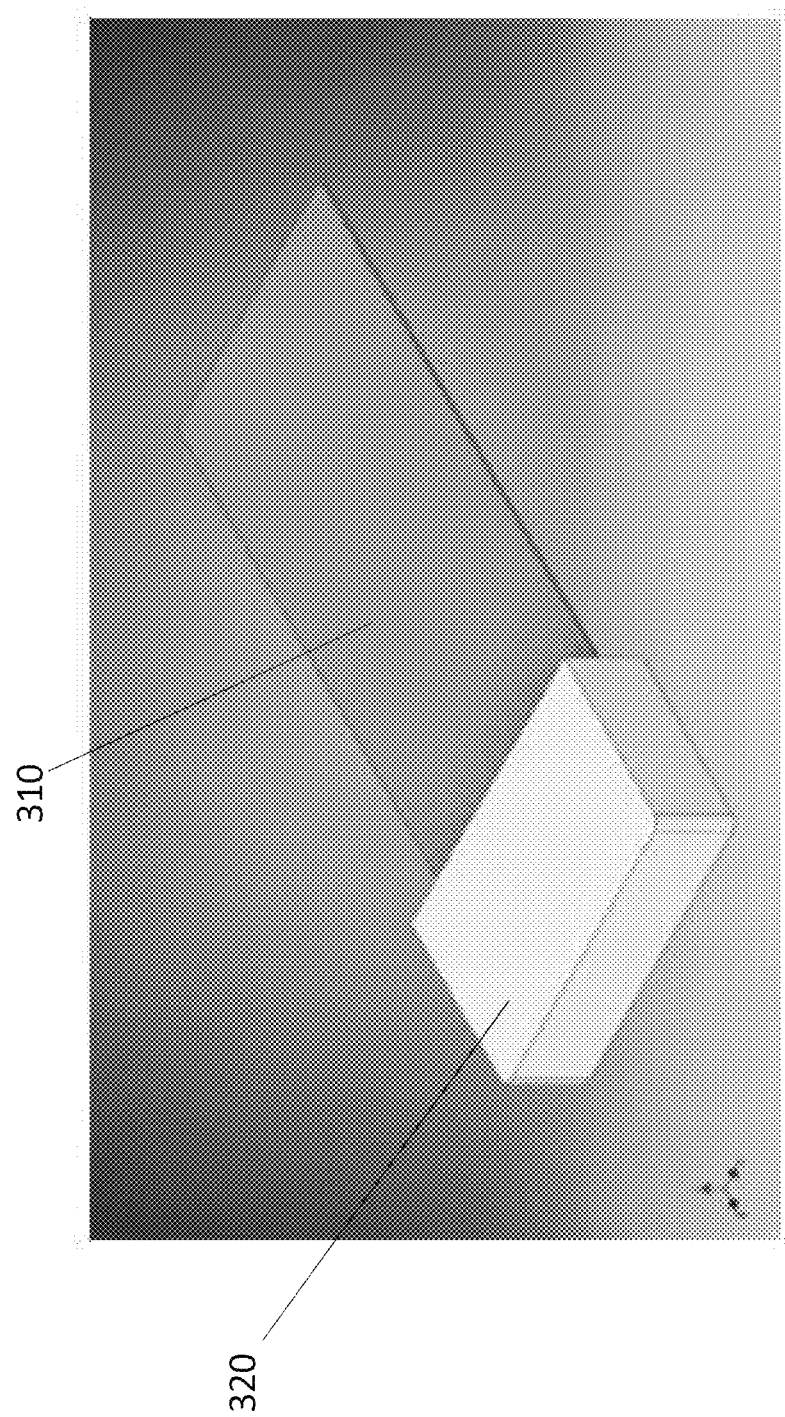
FIG. 3 depicts a CAD-generated image of a device according to an embodiment of the subject invention.
Figure 4B:
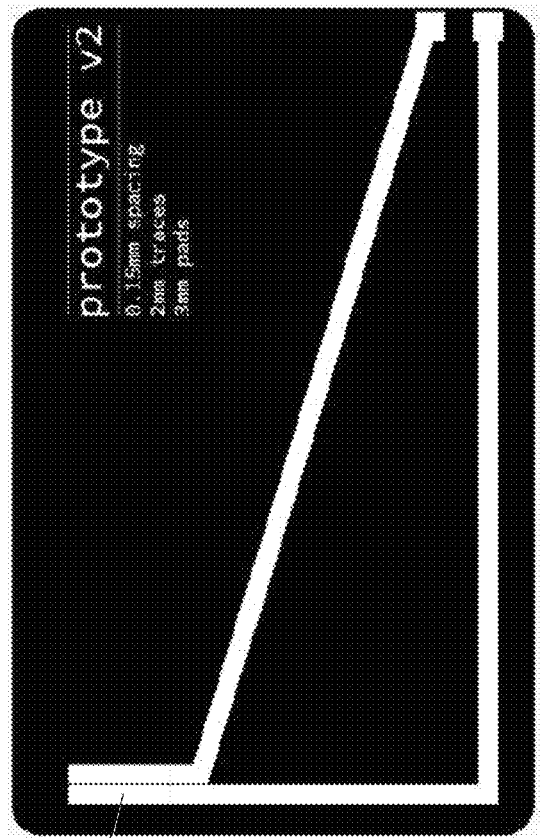
FIGS. 4A-4E depict CAD-generated images of PCB traces.
Figure 4A:
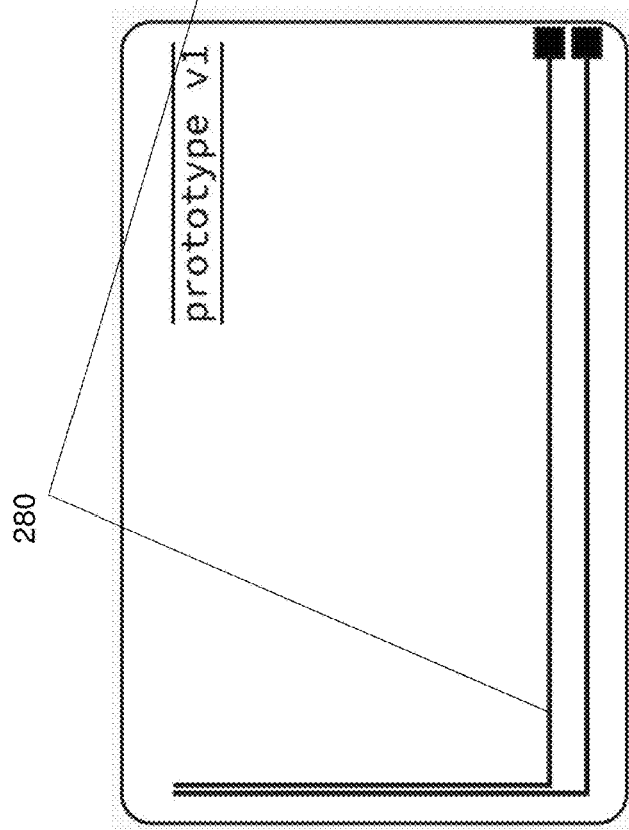
Figure 4D:
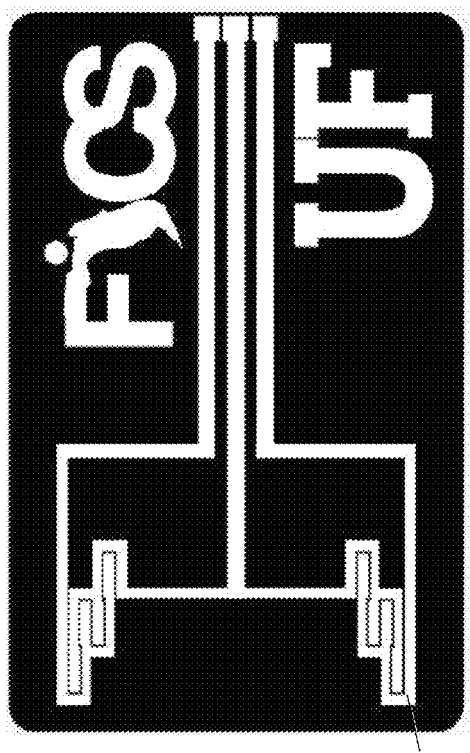
Figure 4C:
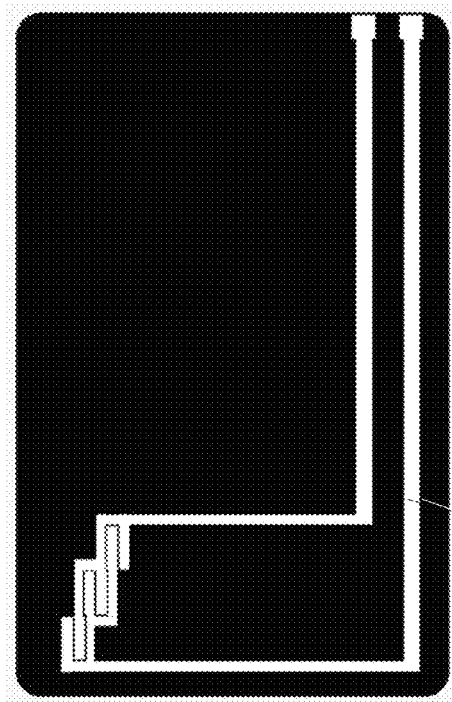
Figure 4E:
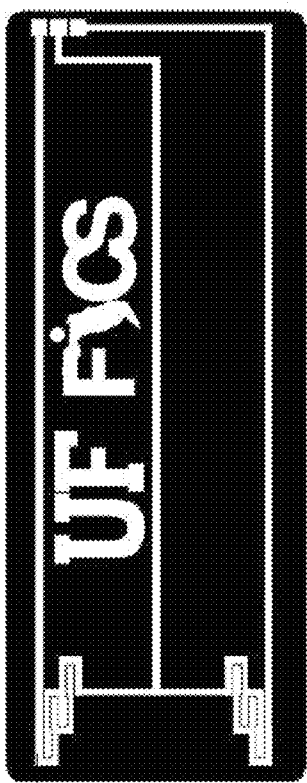

In an embodiment of the subject invention, a stand-alone device may be capable of detecting overlay skimmers in magnetic stripe card readers. As seen in FIG. 3, a PCB 310 in the shape of a magnetic stripe card can be connected to an analysis system 320. Global positioning system (GPS) functionality and/or data logging functionality may be included, as can a processor 120. A battery 140, which can be connected to a charging circuit to allow a user to charge the device, may be included to provide power.

A power switch that turns on the device may be provided and located, for example, on an upper left side of the device. A display screen (e.g., an OLED screen) may be in operable communication with the processor 120. Such a display can be located, for example, on the upper face of the device and may be illuminated such as to prompt the user with the option of visible instructions, though embodiments are not limited thereto. The display may be a touch screen display. The OLED display can be configured to display, for example, 128×32 pixels.

Figure 6A:
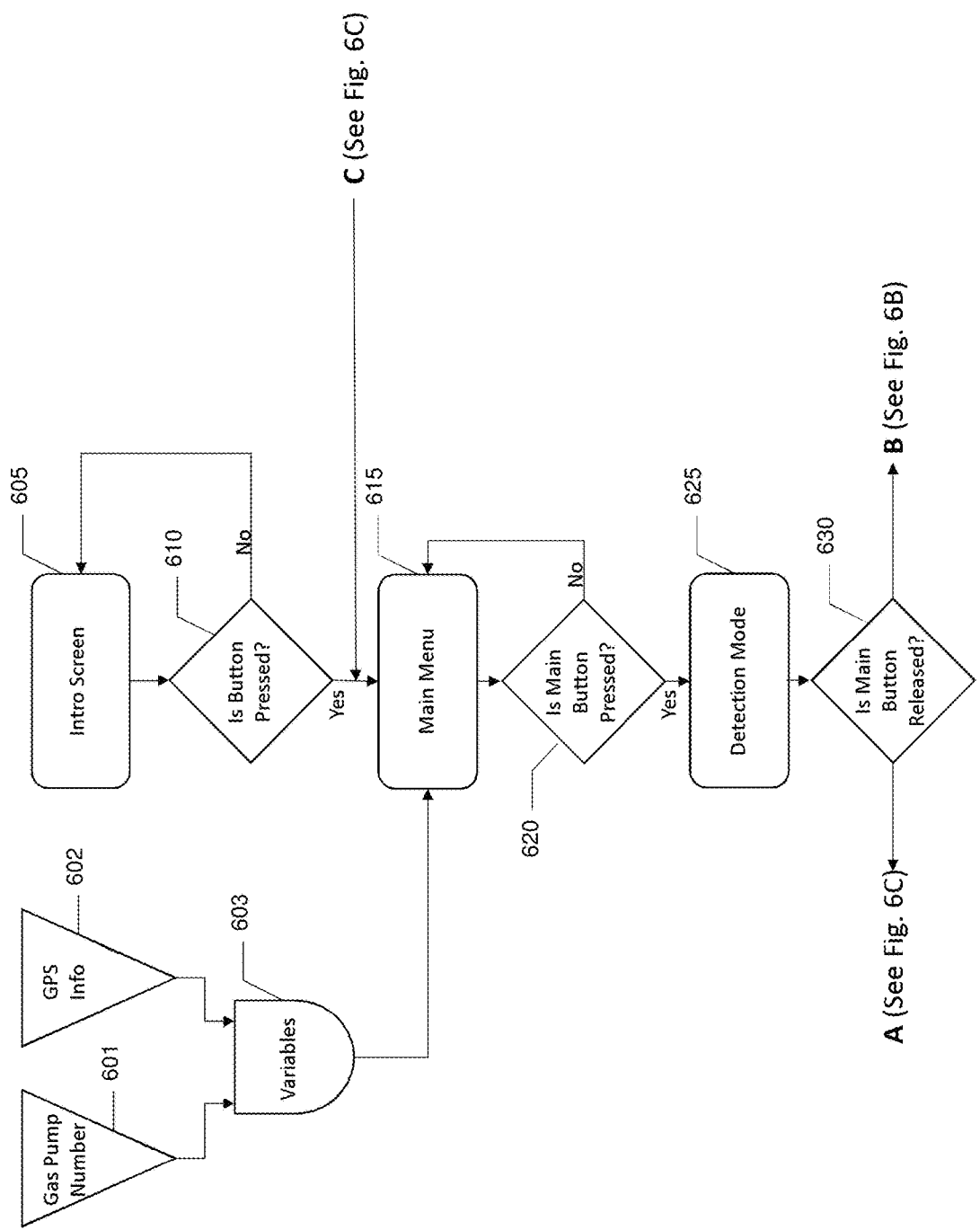
FIGS. 6A-C depict a block diagram flow chart of code operating on a device according to an embodiment of the subject invention.
Figure 6B:
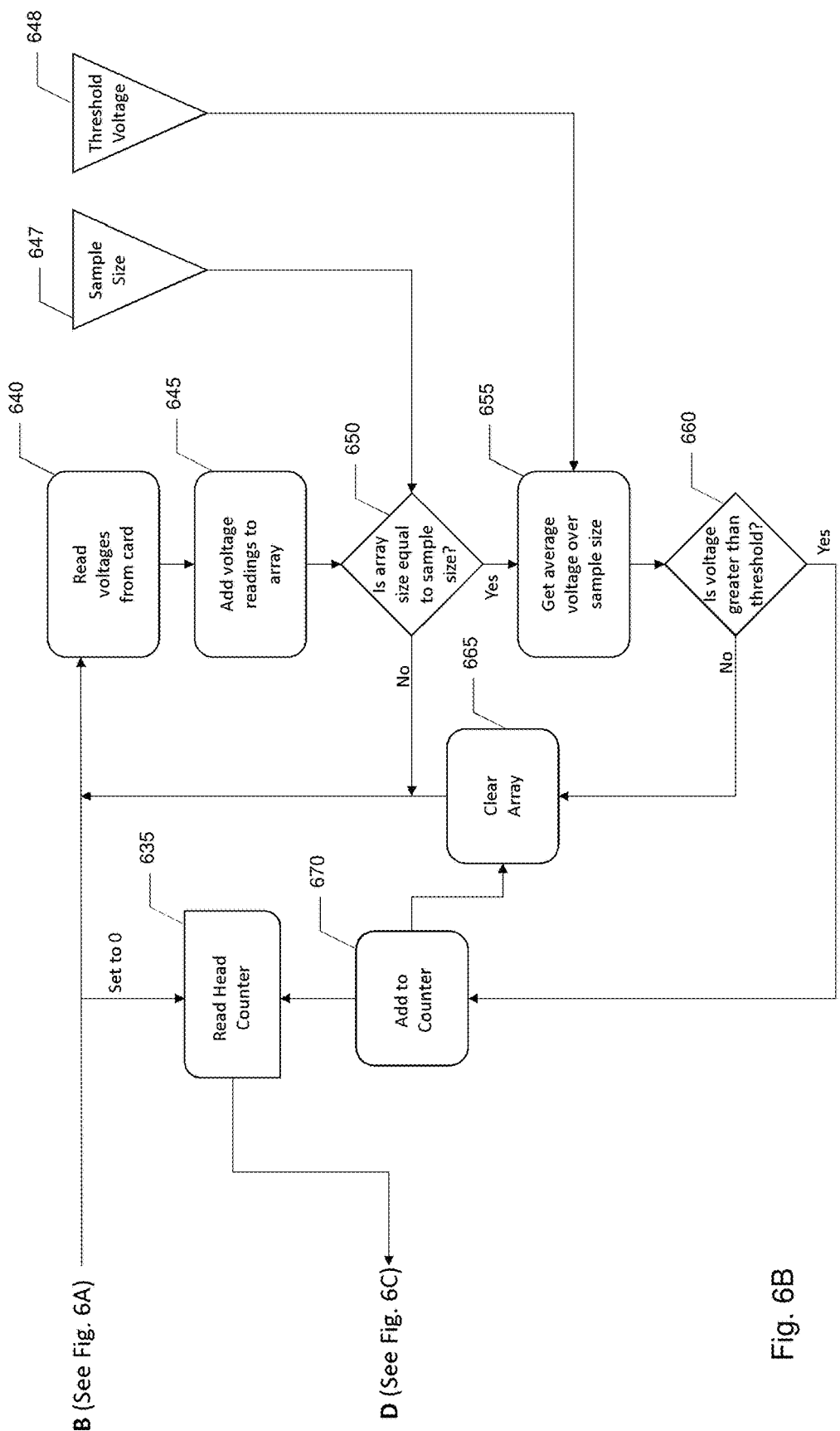
Figure 6C:
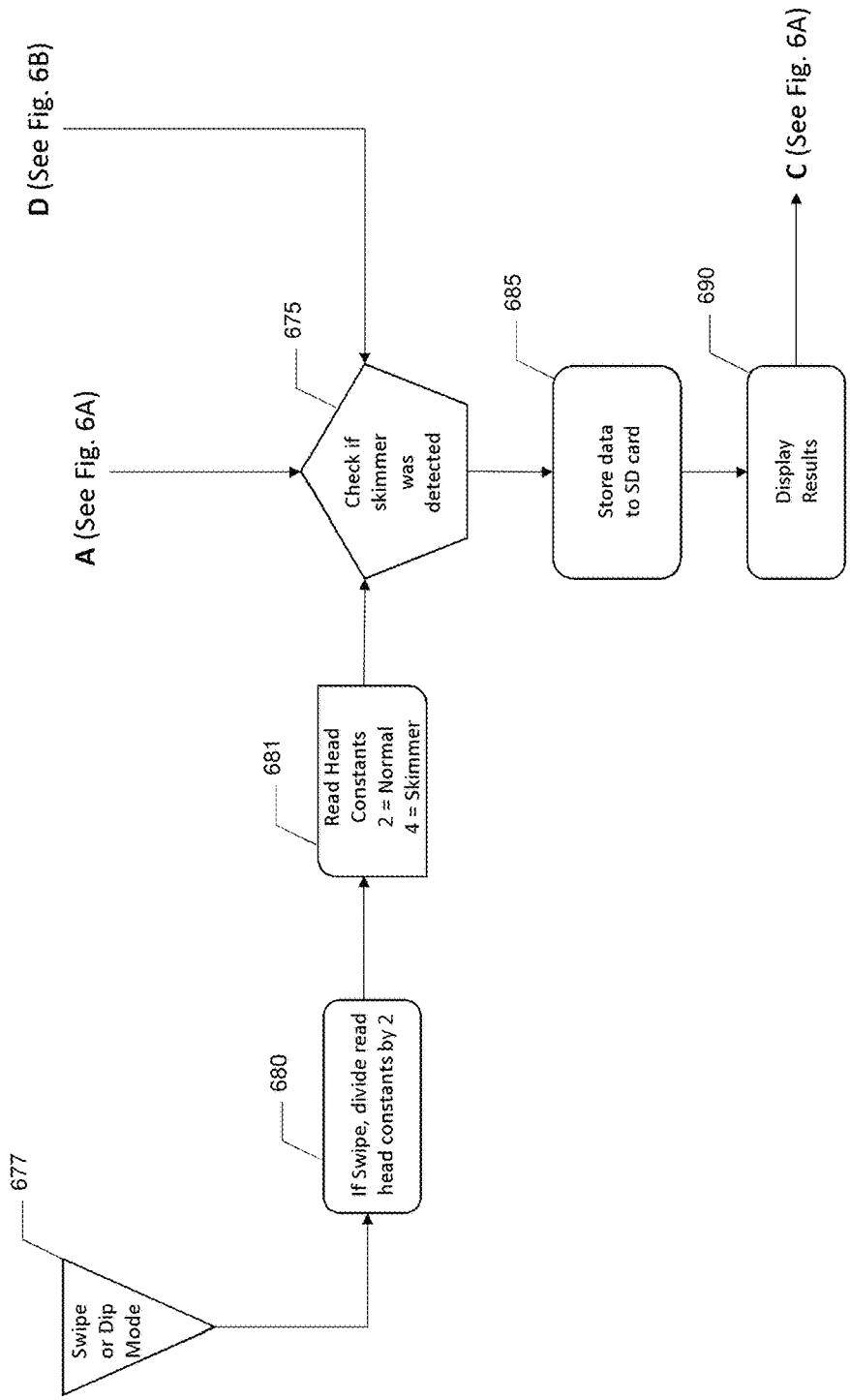

Turning to FIGS. 6A-6C, an algorithmic approach is described which allows the device to determine if the detection card has touched a magnetic read head.

A user may cause a list of instructions to be displayed by pressing a button at step 610 which may be located on the outside of the device case 510 (see, for example, FIGS. 5A and 5B). After the introductory text 605, a device main menu can be displayed at step 615 with a graphical user interface (GUI). The menu can display a variety of information to the user. Battery information may be displayed to alert the user that the battery is running low on power. The battery can be, for example, a rechargeable lithium ion battery. The device mode can also be displayed, for example to indicate whether the PCB is being inserted into a "dip" style reader or a "swipe" style reader. Therefore, the user may select which type of reader mode is being tested. In order to change the mode, a user can use, for example, a small toggle switch, which can be located, for example, on the bottom of the device case. The mode switch can be an SPST switch, or a side switch. The mode switch may be connected to voltage high and a pin allowing the processor to determine the mode based upon the pin state. Variables 603 such as a gas pump number 601 and GPS information 602 may also be present. A gas pump number 601 can be displayed for when a user is attempting to do a full evaluation of all gas pumps at a gas station. The pump number can be changed by using the user interface which may include buttons, which can be located, for example, on the left side of the device case. The GPS status can be displayed to inform the user if the device was able to successfully triangulate the current location via GPS. The aforementioned features may optionally be included on some example embodiments of the system described herein.

An LED button on the device, which can be located above the mode toggle switch, may illuminate to indicate that the device is operational. The LED button can be, for example, a pushbutton (e.g., a 16-mm pushbutton) or an SPTS (single pole toggle switch) button. Upon pressing the button at step 620, the device may enter Detection Mode at step 625 and begin reading voltages from the card and the LED on the button may optionally blink periodically to indicate operation. The user can insert the detection card into a magnetic stripe reader and remove the card from the reader.

While in Detection Mode, the algorithmic process continues (B) to FIG. 6B where a Read Head Counter 635 is set to 0 and voltages are read from the card at step 640. At step 645, the voltage readings are added to an array. The array size is then checked against a sample size 647 at step 650. If the array size is equal to the sample size 647, the process continues to step 655, where a voltage is determined by a calculation of average voltage over sample size. At step 660, the voltage is checked against a threshold voltage 648. If the voltage is not greater than the threshold voltage 648, the array is cleared at step 665 and the process returns to step 640. However, if the voltage is greater than the threshold voltage 648, the Read Head Counter 635 is incremented at step 670.

Upon removal of the detection card from the magnetic stripe reader, the user can press the button again at step 630 to terminate detection. The algorithmic process then continues (A) to FIG. 6C. Using the Read Head Counter 635 (D), the processor may determine if any skimmers were found in the reader at step 675. The mode variable 677 may be checked at step 680 to see if the device is in "swipe" or "dip" mode. If the device is in swipe mode, the Read Head Counter constants may be divided by two in order to determine if a skimmer is present. As shown in step 681, two read head constants indicates normality, and four read head constants indicate the likely presence of a credit card skimmer. The results, along with GPS data, mode, and pump number or terminal number, may be recorded to an internal memory, such as an SD card or flash memory at step 685 and may be displayed on the screen at step 690. The results screen may then be dismissed by pressing a button, which may be located on the higher of the two side buttons on the left side of the box. Pressing this button may return the user to the main screen (C) and the process can then be repeated. While an example embodiment of a card skimmer detector device may store locally information related to detected card skimmers or lack thereof and associated card swiping devices, example embodiments may optionally be configured to transmit via wired or wireless connection such information. This information may create an audit trail of the card swipe/payment devices and when they have been inspected, together with the results. Further, the audit trail created in this manner may be centrally stored to provide a database of audit trails in the event a card skimmer or plurality of card skimmers are detected at a specific location or across a geographic region. The aforementioned features may optionally be included on some example embodiments of the system described herein.

While the above described embodiment uses electrical connections to function as the read head counter, an optional embodiment, which may be used in conjunction with the aforementioned embodiment or independently thereof, may include pressure sensors or transducers to count the number of read heads present in the card reader. These pressure sensors may generate a signal when a force satisfying a predetermined value is observed. Such sensors would allow the detection card to determine when a read head is pressed against it, thereby sending a signal to the processing unit. Such a signal would be processed in a manner similar to those described above with respect to the electrical contact method of determining read heads. This method of using pressure sensors or transducers may be used in conjunction with the electrical contact method for additional feedback that can be used as quality control or to provide an increased level of confidence with respect to the number of read heads determined.

Figure 7:
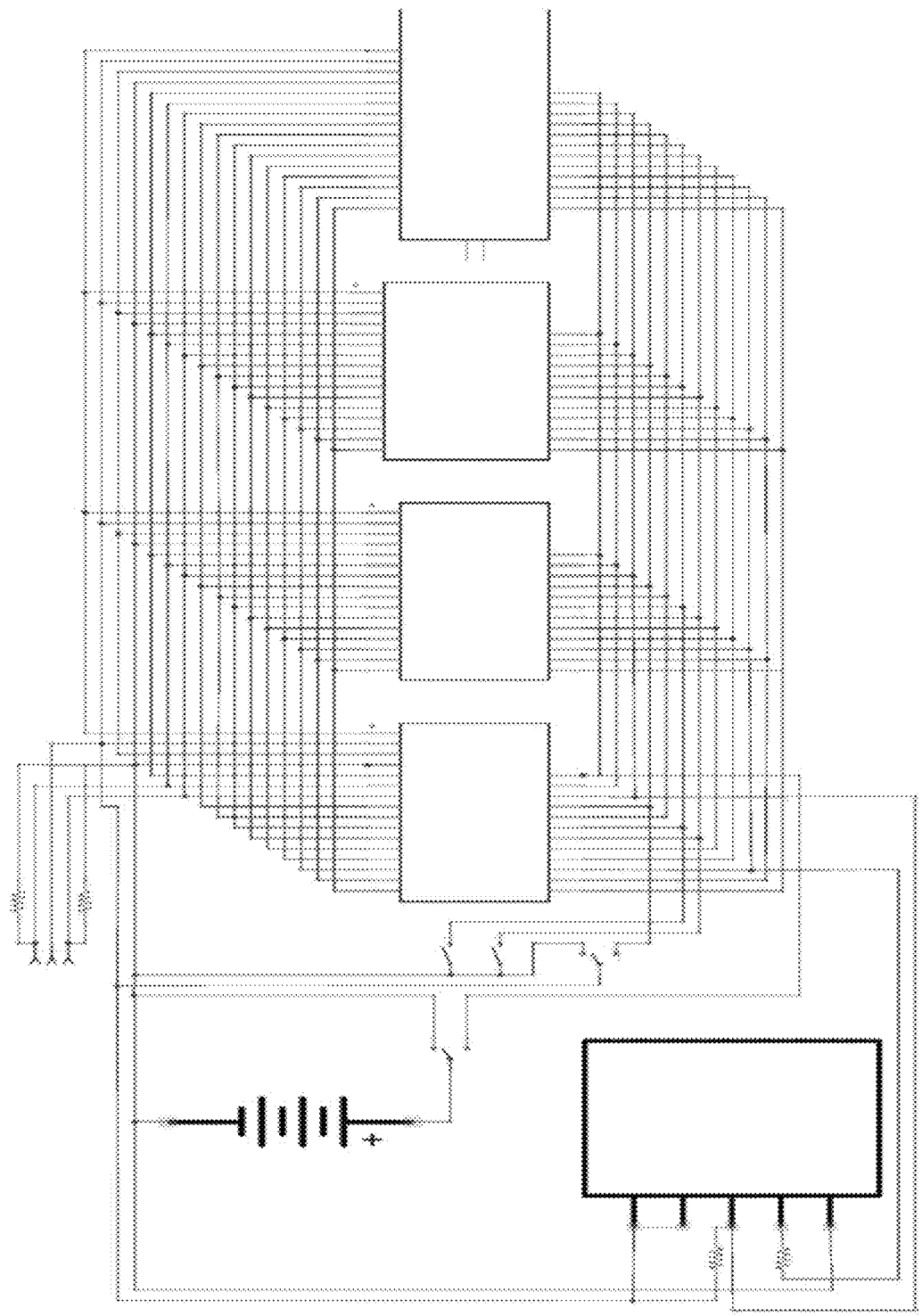
FIG. 7 illustrates a circuit diagram of an embodiment of the subject invention.

A schematic circuit diagram of a device of an embodiment of the subject invention is illustrated in FIG. 7. In an example embodiment, a device may be limited to informing the user if an additional read head was found for simplicity. A casing can cover the components on the card and may include a plurality of LEDS that may be configured to indicate if a skimmer was detected, if there was an error in detection, or if the detection process is functioning properly. The device may include a processor and a battery that can be connected to a charging circuit, allowing the user to charge the device, such as using a micro USB, for example.

An example embodiment of a method of operation with respect to an example apparatus is described herein. According to the example embodiment, the device may include a small toggle switch that may cause the device to be turned on. The LED or LEDs (e.g., three LEDs) may illuminate in a specific pattern or sequence when the device is ready. The toggle switch may be a pushbutton SPST switch, or a surface mounted device. The toggle switch may further be connected to ground and a pin. The LEDs may, for example, illuminate in different colors, be connected to a pin, and have an operating voltage of about 3 to 6 volts. A second switch may be located on the back of the case, which can be used to set the mode. Upon pressing a pushbutton next to the switches, the LEDs may begin to blink. The detection card can be inserted into the magnetic stripe reader and removed from the reader. The processor 120 may determine the number of detected read heads and provide an indication of the number of detected read heads, such as using a number of LEDs that corresponds to the calculated results. The corresponding LED may then turn off, followed by all of the LEDs turning back on indicating the device is ready to operate.

In another embodiment, a device can be similar to the design discussed above, but the mode switch, LEDs, and button can be removed and replaced with circuitry configured to transmit information wirelessly, for example including a Bluetooth module. By replacing the components, the size of the device can be reduced as the only remaining hardware components can be the wireless circuitry, processor, battery, and charging circuit.

The device may connect with an application, including a mobile device application. The user may connect to the device with a smartphone or other mobile device and control the settings and detection via an application and the user interface of the smartphone or other mobile device. The results may be sent back to the application and displayed on a screen for the user. The results may be recorded with location and time by using the capabilities on the connected devices.

The device of example embodiments may operate as follows by first turning the power of the device on. The screen may become visible and display text. The initial text may be dismissed and instructions requested. An LED indicating that the device is in operation may be illuminated. A first prompt may request a gas pump number or payment transaction device identification. The value can be input through a user interface such as a virtual keyboard or using directional buttons located on the device. The status of the GPS module may be displayed. If the device is properly connected to GPS satellites, the status may indicate that the device is connected and a location is determined. If the device is not receiving signals from GPS satellites, the status may indicate that the device is searching for a GPS signal or is unable to connect. A mode of the device may be displayed on the screen, for example "dip" or "swipe" type payment transaction device. The mode may optionally indicate the type of credit card reader being processed. The mode may be changed through a user interface, such as a virtual keyboard or a switch, which may be located on the face of the device proximate a bottom of the device. The battery life may also be displayed on the screen. The device may be charged through a mini USB cable and a standard phone charger, for example, to provide a convenient and ubiquitous power source. To begin the detection process, a user can press a button, which may be located at a center of the device. The button may produce a visible blinking signal to indicate that the device is in a detection mode. A user can insert and remove the PCB into a card reader. After removing the detection card, a user may press the button again. The device may then display the results of the detection process on the screen. The device may detect skimmers on both the left and right side of the credit card reader. The results for both sides of the detection card may be displayed on the screen. The sides can be identified as "text side" and "blank side." The possible results that can be received are as follows: (1) no skimmers detected: the detector found that the reader is properly operating for this side; (2) possible skimmer detected: the detector found that the reader may have a skimmer attached (if this result is received, a user can run another detection to verify this result; (3) error try again: something went wrong with the detection; or (4) nothing detected: the detector found that this side is not configured to read credit cards at all.

After completing the detection process, the user may flip the detection card with the PCB over and run the detection again for the bottom side of the credit card reader. After running the detection process for both sides of the card, the user can move on to another card reader and repeat the detection process.

The methods and processes described herein may be embodied as code and/or data. The software code and data described herein may be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the non-transitory computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A device for detecting the presence of a credit card skimmer, the device comprising:
    a printed circuit board (PCB) comprising a pattern of electrical traces on its surface, wherein the PCB is configured to be insertable into a credit card reader or scanner; and
    a non-transitory machine-readable medium in operable communication with the PCB and comprising instructions stored thereon that, when executed, cause at least one processor to:
    direct an electrical voltage to a trace of the pattern of electrical traces, and
    detect an instance of electrical current between two points of the trace in response to the presence of a read head providing an electrical contact between the two points of the trace, wherein the pattern comprises a gap disposed between the two points;
    increment a counter based on a number of detected instances of electrical current between the two points of the trace;
    identify a mode of detection comprising a swipe mode or a dip mode;
    identify a number of read heads based on the detected number of instances of electrical current between the two points of the trace in response to the mode of detection being identified as swipe mode;
    identify a number of read heads based on the detected number of instances of electrical current between the two points of the trace divided by two in response to the mode of detection being identified as dip mode; and a communication interface configured to providing an indication of the presence of a credit card skimming device within the credit card reader in response to identifying more than one magnetic read head within the credit card reader.

2. The device according to claim 1, wherein the electrical traces are flat.

3. The device according to claim 1, wherein the electrical traces extend beyond the surface of the PCB.

4. The device according to claim 1, further comprising a magnetic stripe component configured to allow the PCB to identify itself to a terminal.

5. The device according to claim 1, wherein the PCB is directly connected to the machine-readable medium.

6. The device according to claim 1, wherein the PCB further comprises wireless circuitry, and wherein the wireless circuitry is configured to communicate with the machine-readable medium.

7. The device according to claim 1, wherein the PCB further comprises an accelerometer, and is configured to automatically identify a dip mode from insertion into a "dip" style reader and a swipe mode from insertion in a "swipe" style reader based on a signal from the accelerometer.

8. The device according to claim 1, further comprising circuitry configured to provide location-based services functionality.

9. The device according to claim 1, wherein the PCB has a credit card shape.

10. The device according to claim 1, further comprising a case in which the machine-readable medium is disposed.

11. The device according to claim 1, further comprising:
a processor in operable communication with the machine-readable medium, wherein the instructions stored on the machine-readable medium, when executed, cause the processor to direct the electrical voltage and detect the electrical current between the two points;
at least one switch;
at least one button;
a display; and
a power source.

12. The device according to claim 11, wherein the processor, the at least one switch, the at least one button, the display, and the power source are disposed in or on the case.

13. A method for detecting the presence of a credit card skimmer, the method comprising:
inserting a printed circuit board (PCB) comprising a pattern of electrical traces on its surface into a card scanner or reader;
applying a voltage to a trace of the pattern of electrical traces; and
detecting a current along two points of the trace;
wherein the pattern of electrical traces comprises a gap;
wherein the gap is disposed between the two points; and
wherein, in response to a current being detected along two points of the trace, increment a read head counter to identify a number of instances of electrical current detected along the two points of the trace
identify a mode of detection comprising a swipe mode or a dip mode;
identify a number of read heads based on the identified number of instances of electrical current between the two points of the trace in response to the mode of detection being identified as swipe mode;
identify a number of read heads based on the identified number of instances of electrical current between the two points of the trace divided by two in response to the mode of detection being identified as dip mode; and
providing, via a communication interface, an indication of the presence of a credit card skimming device within the credit card reader in response to identifying more than one magnetic read head within the credit card reader.

14. The method according to claim 13, further comprising determining an appropriate number of read heads associated with a particular card scanner or reader; and
comparing the appropriate number of read heads to a number of read heads detected.

15. The method according to claim 13, wherein the PCB further comprises an accelerometer, and is configured to automatically identify a dip mode from insertion into a "dip" style reader and a swipe mode from insertion in a "swipe" style reader based on a signal from the accelerometer.

16. The method according to claim 13, further comprising using location-based services to determine a location of the card scanner or reader.

17. The method according to claim 13, further comprising outputting a result of the detection to a remote device.

18. An apparatus comprising:
a substrate sized to be received within a credit card reader;
a circuit disposed on the substrate, wherein the circuit comprises at least one electrical trace comprising two points on the trace defining a gap there between;
a processor configured to direct an electrical voltage to the at least one electrical trace and to detect an electrical current between the two points of the trace, wherein the electrical current identifies a magnetic read head;
increment a counter based on a number of detected number of instances of electrical current between the two points of the trace;
identify a mode of detection comprising a swipe mode or a dip mode;
identify a number of read heads based on the detected number of instances of electrical current between the two points of the trace in response to the mode of detection being identified as swipe mode; and
identify a number of read heads based on the detected number of instances of electrical current between the two points of the trace divided by two in response to the mode of detection being identified as dip mode; and
a communication interface configured to provide an indication of the presence of a credit card skimming device within the credit card reader in response to identifying more than one magnetic read head within the credit card reader.

19. The apparatus of claim 18, wherein the communication interface comprises a wired or wireless connection to a user device, wherein the user device comprises a display to provide an indication of the presence of the credit card skimming device.

20. The apparatus of claim 18, wherein the substrate comprises at least one pressure sensor disposed thereon, wherein the pressure sensor is configured to provide an indication of application of pressure to the pressure sensor in response to the sensor passing a magnetic read head of the credit card reader, wherein the processor is configured to establish a number of magnetic read heads in response to pressure signal from the pressure sensor.

* * * * *